United States Patent
Pursifull (10) Patent No.: US 9,228,486 B2
(45) Date of Patent: Jan. 5, 2016

(54) METHOD AND SYSTEMS FOR REDUCING CHARGE AIR COOLER CONDENSATE USING A SECONDARY INTAKE THROTTLE

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 14/084,295

(22) Filed: Nov. 19, 2013

(65) Prior Publication Data

US 2015/0135705 A1 May 21, 2015

(51) Int. Cl.
*F02B 33/44* (2006.01)
*F02B 33/00* (2006.01)
*F02B 29/04* (2006.01)

(52) U.S. Cl.
CPC ................... *F02B 29/0431* (2013.01)

(58) Field of Classification Search
CPC ........ F02B 37/16; F02B 37/18; F02B 37/186; F02D 23/00; F02D 2200/0418; F02D 9/02; F02D 2009/0272; F02D 2041/0022; F02D 41/0002; F02M 25/0707
USPC .............. 60/611, 605.1, 605.2, 602; 123/563; 165/51, 41
See application file for complete search history.

(56) References Cited

U.S. PATENT DOCUMENTS

| | | | |
|---|---|---|---|
| 7,958,871 B2 | 6/2011 | Koenigsegg | |
| 8,056,339 B2 | 11/2011 | Lippa et al. | |
| 8,353,275 B2 | 1/2013 | VanDerWege et al. | |
| 2014/0047833 A1* | 2/2014 | Buckland et al. | 123/563 |
| 2014/0048048 A1* | 2/2014 | Glugla et al. | 123/542 |
| 2014/0048049 A1* | 2/2014 | Glugla et al. | 60/611 |
| 2014/0075976 A1* | 3/2014 | Glugla et al. | 123/563 |
| 2014/0100758 A1* | 4/2014 | Glugla et al. | 701/102 |

OTHER PUBLICATIONS

Pursifull, Ross D., "Method for Purging Charge Air Cooler Condensate During a Compressor Bypass Valve Event," U.S. Appl. No. 13/852,950, filed Mar. 28, 2013, 35 pages.
Glugla, Chris Paul et al., "Wastegate Control to Reduce Charge Air Cooler Condensate," U.S. Appl. No. 13/886,086, filed May 2, 2013, 40 pages.
Morelli, Anthony et al., "Compressor Recirculation Valve Control to Reduce Charge Air Cooler Condensate," U.S. Appl. No. 13/886,101, filed May 2, 2013, 40 pages.

* cited by examiner

*Primary Examiner* — Thai Ba Trieu
*Assistant Examiner* — Ngoc T Nguyen
(74) *Attorney, Agent, or Firm* — Julia Voutyras; Alleman Hall McCoy Russell & Tuttle LLP (57) ABSTRACT

Methods and systems are provided for adjusting a secondary intake throttle based on condensate formation in a charge air cooler, the secondary throttle positioned upstream of the charge air cooler. In one example, a method may include decreasing an opening of the secondary intake throttle in response to increased condensate accumulation within the charge air cooler. The method may further include adjusting a primary throttle positioned in an intake manifold based on the condensate accumulation and torque demand.

20 Claims, 4 Drawing Sheets

METHOD AND SYSTEMS FOR REDUCING CHARGE AIR COOLER CONDENSATE USING A SECONDARY INTAKE THROTTLE

BACKGROUND/SUMMARY

Engines may utilize a turbocharger or supercharger to compress ambient air entering the engine in order to increase power. Compression of the air may cause an increase in air temperature, thus, an intercooler or charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point temperature. Further, when the charge air entering the CAC is boosted (e.g., an induction pressure and boost pressure are greater than atmospheric pressure), condensate may form if the CAC temperature falls below the dew point temperature. As a result, condensate may collect at the bottom of the CAC, or in the internal passages of the CAC. When torque is increased, such as during acceleration, increased mass air flow may strip the condensate from the CAC, drawing it into the engine and increasing the likelihood of engine misfire and combustion instability.

Other attempts to address condensate formation include restricting intake air travelling through the CAC or restricting ambient air flow to the CAC in order to increase the temperature of CAC air. One example approach is shown by Craig et al. in U.S. Pat. No. 6,408,831. Therein, the intake air temperature is controlled by an ambient air flow restriction system and an intake air flow restriction system. A controller defines the position of these restriction devices and is connected to a plurality of sensors which measure different variables such as ambient air and intake air temperatures.

However, the inventors herein have recognized potential issues with such systems. Specifically, blocking or restricting cold air from flowing through the CAC may be challenging and expensive to implement. Further, cooling airflow flowing toward the CAC may also be used to cool other engine system components. Thus, restricting cooling airflow to the CAC may also restrict cooling airflow to the other engine system components.

In one example, the issues described above may be addressed by a method for adjusting a secondary throttle positioned downstream of a compressor and upstream of a charge air cooler responsive to condensate forming conditions at the charge air cooler. For example, adjusting the secondary throttle may include decreasing an opening of the secondary throttle in response to a condensate level in the CAC increasing above a threshold level. Decreasing the opening of the secondary throttle may decrease the pressure, and subsequently the relative humidity, at the CAC. As a result of decreasing the CAC pressure, the condensate level within the CAC may decrease, thereby reducing the likelihood of unstable combustion and/or engine misfire due to condensate ingestion.

As one example, the secondary throttle is positioned within an intake passage of an engine, upstream of the primary throttle and CAC and downstream of a compressor. The primary throttle may be adjusted based on torque demand during engine operation when the condensate level is greater than the threshold level. Further, the secondary throttle may be fully open during this time. However, when the condensate level in the CAC increases above the threshold level, an engine controller may decrease the opening of the secondary throttle if the primary throttle is not fully open (as required by torque demand). The engine controller may also increase the opening of the primary throttle in order to compensate for decreasing the opening of the secondary throttle and continue to provide the demanded torque. The secondary throttle position may be reduced for a duration until the condensate level decreases and/or until torque demand increases requiring a larger opening of the secondary throttle. In this way, adjusting the positions of the primary throttle and the secondary throttle may reduce condensate accumulating within the CAC, thereby reducing the likelihood of condensate-related engine misfire events.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
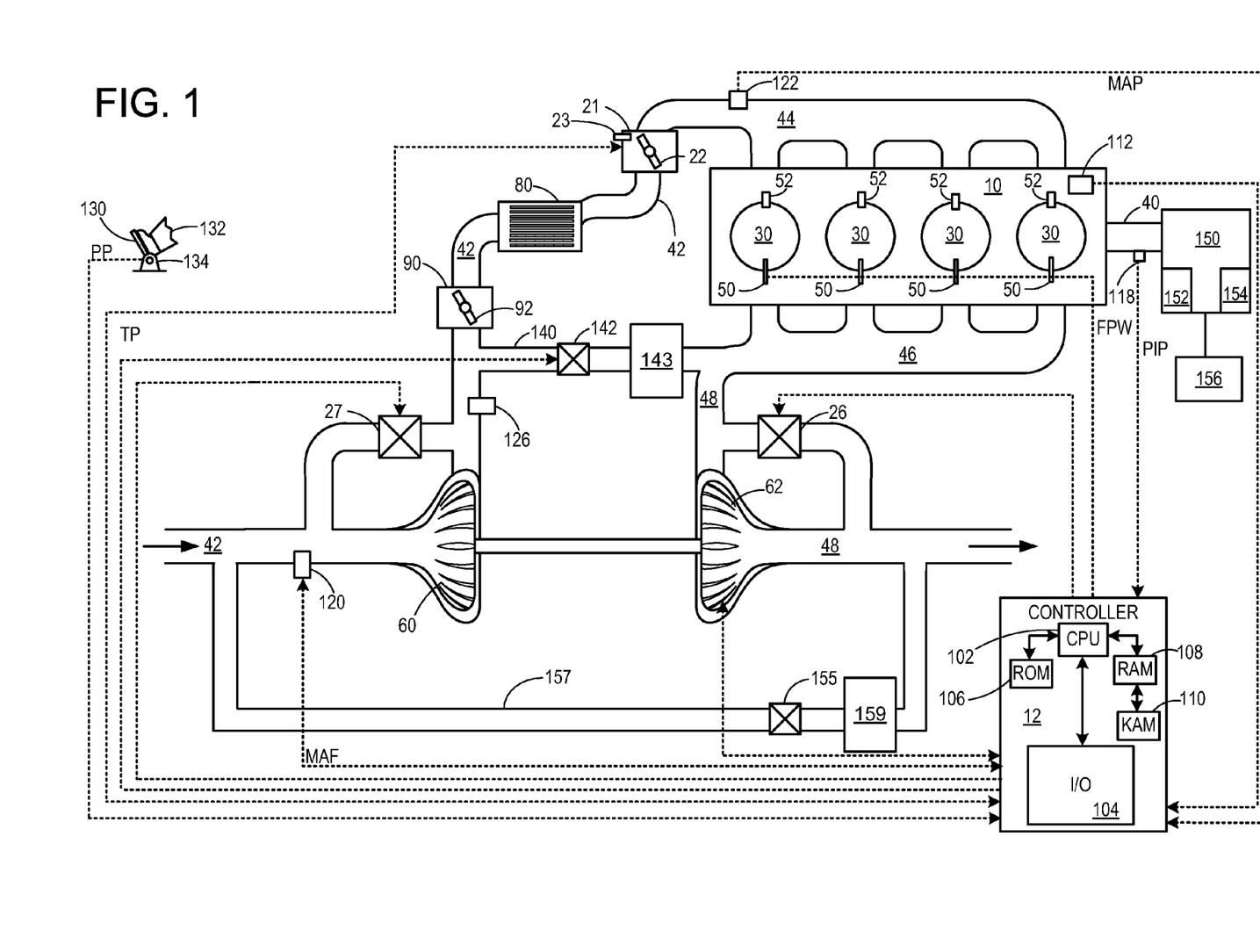
FIG. 1 is a schematic diagram of an example engine system including a charge air cooler and a secondary intake throttle.
Figure 2:
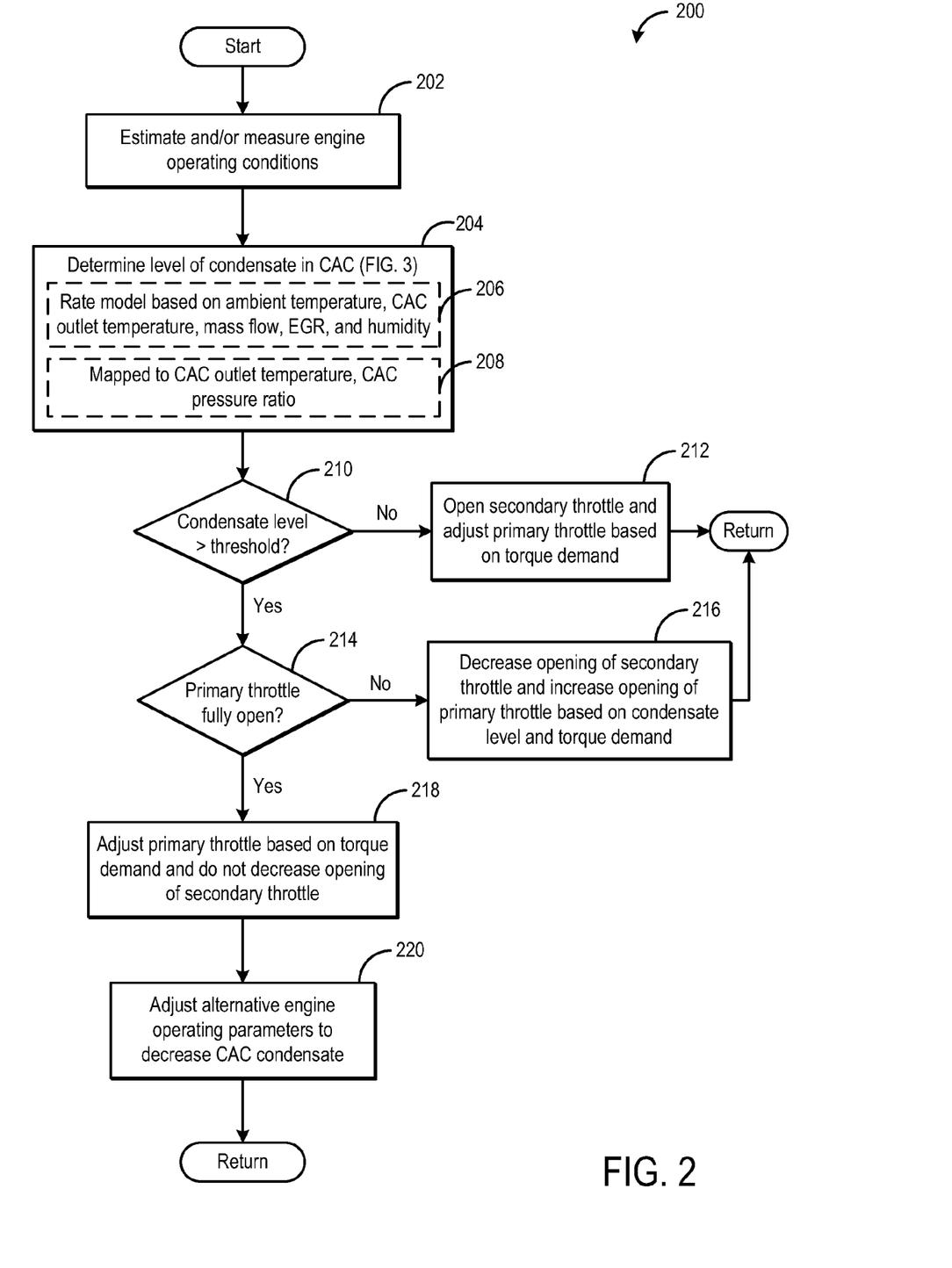
FIG. 2 show a flow chart of a method for adjusting a secondary intake throttle based on condensate formation in a charge air cooler.
Figure 3:
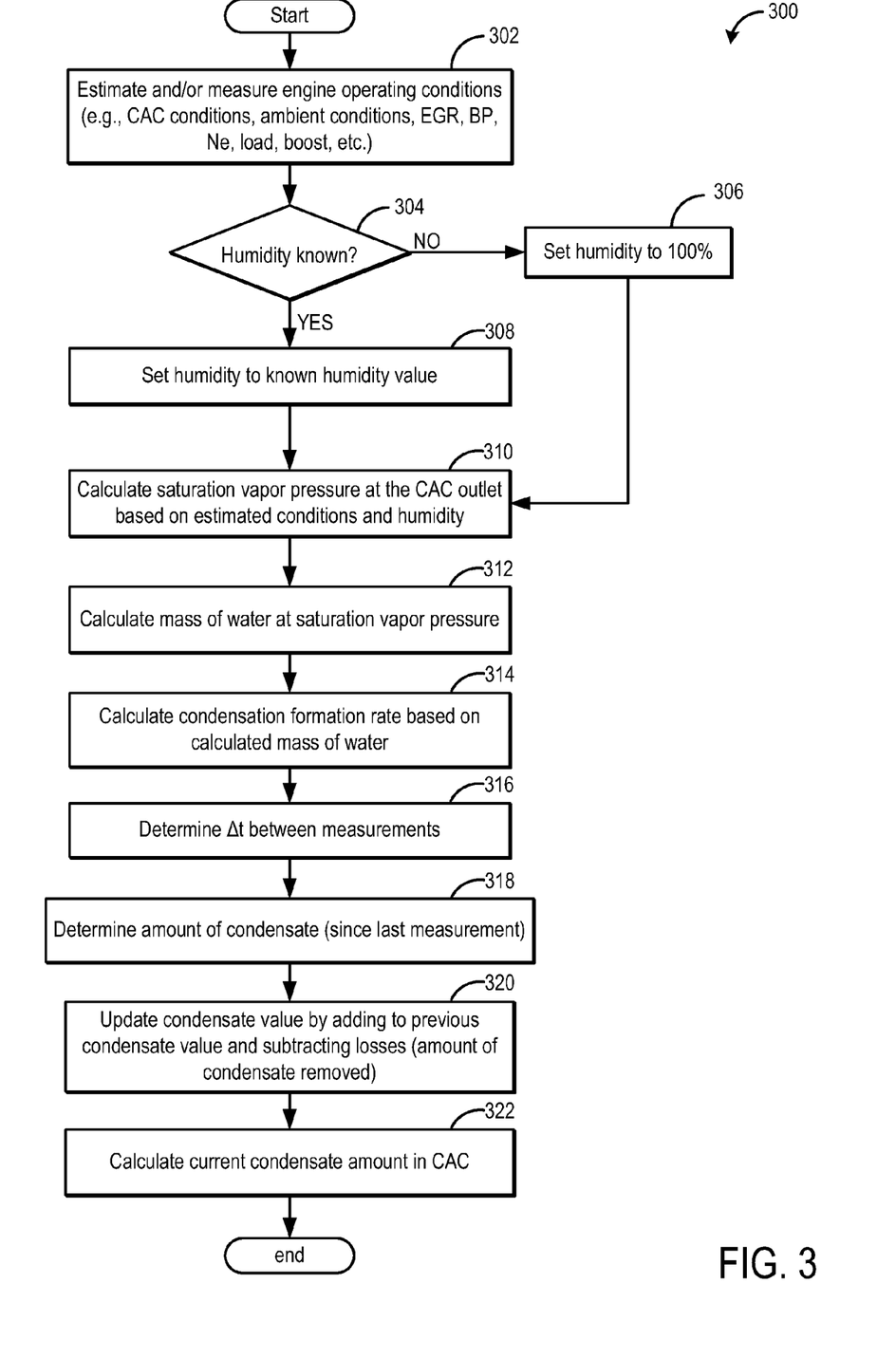
FIG. 3 shows a flow chart of a method for inferring a condensate level at the charge air cooler.
Figure 4:
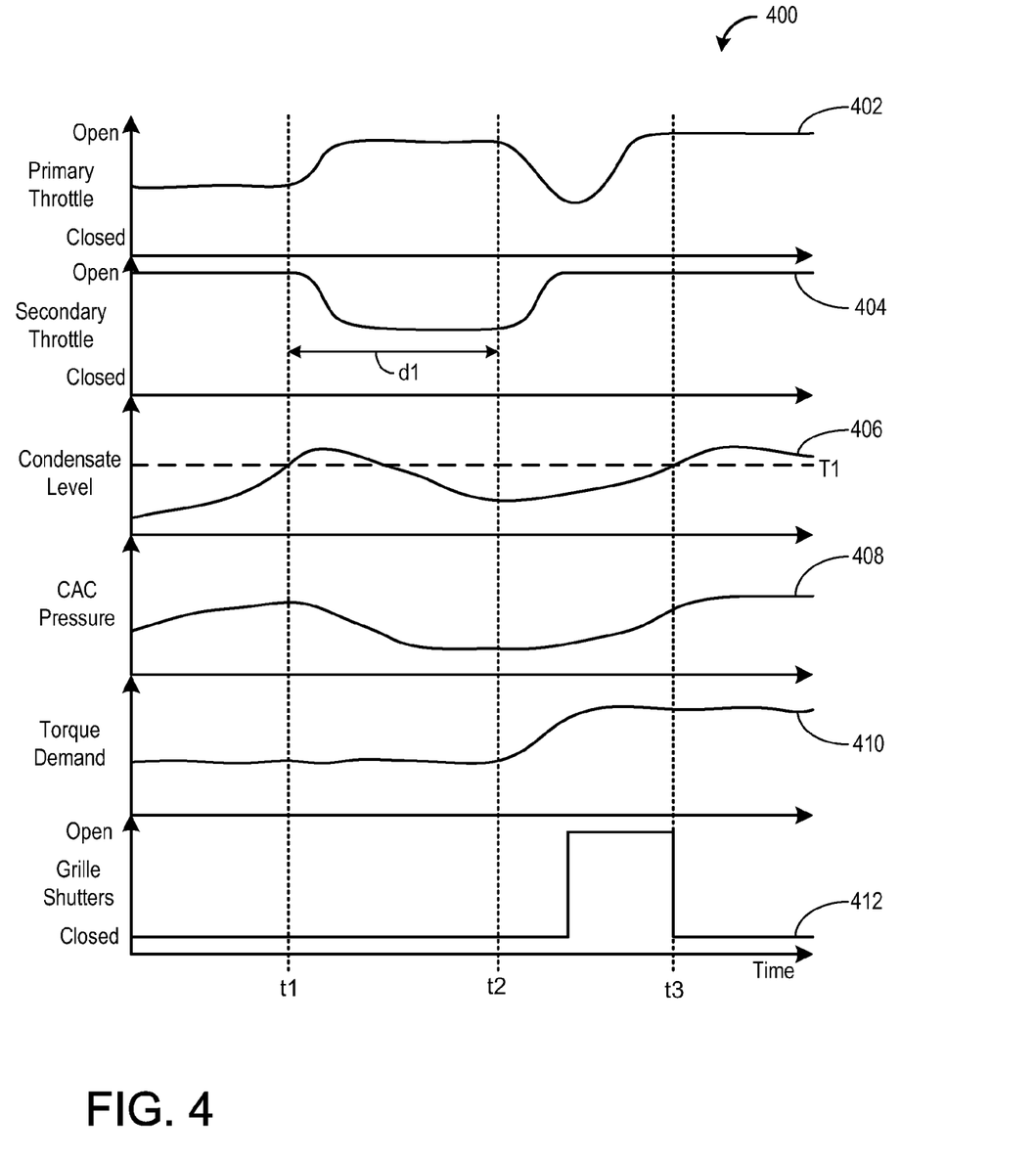
FIG. 4 is a graph of example adjustments to a primary throttle position and a secondary throttle position based on charge air cooler condensate and torque demand.

The following description relates to systems and methods for adjusting a secondary intake throttle positioned in an intake of an engine system, such as the engine system shown in FIG. 1. The secondary throttle may be positioned within an intake passage, downstream of a compressor and upstream of a charge air cooler (CAC) and a primary intake throttle. As such, the primary throttle and the secondary throttle are positioned in series with one another. In some examples, decreasing an opening of the secondary throttle may decrease a pressure at the CAC. As a result, the relative humidity of the air within the CAC may decrease, thereby at least partially "drying out" the CAC and reducing an amount of accumulated condensate within the CAC. FIG. 2 shows a method for adjusting the secondary throttle based on a condensate level within the CAC. The method may further include adjusting the primary throttle based on torque demand and the position of the secondary throttle. For example, during decreasing the opening of the secondary throttle, an engine controller may increase the opening of the primary throttle in order to maintain airflow to the engine and deliver the demanded torque. The amount and duration of decreasing the secondary throttle may be based on the condensate level. A method for determining the condensate level at the CAC is shown at FIG. 3. Example adjustments to the primary throttle and the secondary throttle based on CAC condensate and torque demand are shown at FIG. 4

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure.

Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle via an intermediate transmission system 150. Further, a starter motor may be coupled to crankshaft 40 via a flywheel to enable a starting operation of engine 10. The crankshaft 40 may also be used to drive an alternator (not shown in FIG. 1).

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have four available gears, where transmission gear four (transmission fourth gear) is the highest available gear and transmission gear one (transmission first gear) is the lowest available gear. In other embodiments, the vehicle may have more or less than four available gears. As elaborated herein, a controller may vary the transmission gear (e.g., upshift or downshift the transmission gear) to adjust an amount of torque conveyed across the transmission and torque converter to vehicle wheels 156 (that is, an engine shaft output torque). As the transmission shifts to a lower gear, the engine speed (Ne or RPM) increases, increasing engine airflow. An intake manifold vacuum generated by the spinning engine may be increased at the higher RPM.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in. In an alternate embodiment, compression ignition may be used to ignite the injected fuel.

The intake manifold 44 may receive intake air from an intake passage 42. An engine intake of the engine 10 includes the intake manifold 44 and the intake passage 42. The intake passage 42 and/or intake manifold 44 includes a primary throttle 21 (e.g., first throttle) having a throttle plate 22 to regulate flow to the intake manifold 44. In this particular example, the position (TP) of the throttle plate 22 may be varied by the controller 12 to enable electronic throttle control (ETC). In this manner, the primary throttle 21 may be operated to vary the intake air provided to the combustion chambers 30. For example, the controller 12 may adjust the throttle plate 22 to increase an opening of the primary throttle 21. Increasing the opening of the primary throttle 21 may increase the amount of air supplied to the intake manifold 44. In an alternate example, the opening of the primary throttle 21 may be decreased or closed completely to shut off airflow to the intake manifold 44.

In some embodiments, additional throttles may be present in intake passage 42, such as a throttle upstream of a compressor 60 (not shown). For example, the intake passage 42 may also include a secondary throttle (e.g., second throttle) 90 positioned upstream of a CAC 80 and downstream of a compressor 60. As such, the secondary throttle 90 is upstream of the primary throttle 21. Additionally, the primary throttle 21 and secondary throttle 90 are in series with one another in the engine intake. The secondary throttle 90 may include a throttle plate 92 to regulate flow to the CAC 80 and the primary throttle 21. The position of the throttle plate 92 may be varied by the controller 12 to enable electronic throttle control (ETC). In this manner, the secondary throttle 90 may be operated to vary the intake air provided to the CAC 80. As described further below, the controller 12 may adjust the throttle plate 92 to increase an opening of the secondary throttle 90 or decrease the opening of the secondary throttle 90 based on conditions at the CAC 80. For example, decreasing the opening of the throttle 90 may decrease airflow to the CAC 80 and decrease CAC pressure. This may, in turn, reduce a relative humidity at the CAC 80, thereby reducing condensate within the CAC 80.

Additionally, the throttle position or throttle angle of the primary throttle 21 may be determined with a throttle position sensor 23 positioned at the throttle 21. In one example, the throttle position sensor 23 may measure the angle of the throttle plate 22 relative to the direction of air flow through the intake passage 42. For example, when the throttle plate 22 is completely closed (and blocking airflow through the intake passage 22), the throttle angle may be approximately zero degrees. When the throttle plate 22 is completely open (and perpendicular to airflow) the throttle angle may be approximately 90 degrees. In some examples, the throttle 90 may also include a throttle position sensor. In another example, the throttle 90 may have an elliptical shape wherein approximately seven degrees from perpendicular is a closed throttle position and approximately 83 degrees from perpendicular is an open throttle position.

Further, in the disclosed embodiments, an exhaust gas recirculation (EGR) system may route a desired portion of exhaust gas from the exhaust passage 48 to the intake passage 42 via an EGR passage, such as high pressure EGR passage 140. The amount of EGR provided to the intake passage 42 may be varied by the controller 12 via an EGR valve, such as high pressure EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger through EGR passage 140. FIG. 1 also shows a low pressure EGR system where EGR is routed from downstream of turbine of a turbocharger to upstream of a compressor of a turbocharger through low pressure EGR passage 157. A low pressure EGR valve 155 may control the amount of EGR provided to the intake passage 42. In some embodiments, the engine may include both a high pressure EGR and a low pressure EGR system, as shown in FIG. 1. In other embodiments, the engine may include either a low pressure EGR system or a high pressure EGR system. When operable, the EGR system may induce the formation of condensate from the compressed air, particularly when the compressed air is cooled by the charge air cooler. For example, the low pressure EGR passage 157 may include a low pressure EGR cooler 159 and the high pressure EGR passage 140 may include a high pressure EGR cooler 143.

The engine 10 may further include a compression device such as a turbocharger or supercharger including at least a compressor 60 arranged along the intake passage 42. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12.

In the embodiment shown in FIG. 1, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass or recirculation valve (CRV) 27 configured to divert intake air around the compressor 60. The wastegate 26 and/or the CRV 27 may be controlled by the controller 12 to be opened when a lower boost pressure is desired, for example. For example, in response to compressor surge or a potential compressor surge event, the controller 12 may open the CRV 27 to decrease pressure at the outlet of the compressor 60. This may reduce or stop compressor surge.

In some embodiments, decreasing the opening of the secondary throttle 90 may reduce boost and NVH during tip-out events. For example, a squawk noise may be heard if a large volume of air flows in reverse back through the compressor. However, decreasing the opening of the secondary throttle 90 may reduce the air volume available for reverse flow through the compressor, thereby reducing and/or eliminating the squawk noise. As a result, the size of the CRV 27 may be reduced. In other examples, the CRV 27 may not be included in an engine including the secondary throttle.

The intake passage 42 may further include a charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point temperature. Further, when the charge air entering the CAC is boosted (e.g., boost pressure and/or CAC pressure is greater than atmospheric pressure), condensate may form if the CAC temperature falls below the dew point temperature. When the charge air includes recirculated exhaust gasses, the condensate can become acidic and corrode the CAC housing. The corrosion can lead to leaks between the air charge, the atmosphere, and possibly the coolant in the case of water-to-air coolers. Further, if condensate builds up in the CAC, it may be ingested by the engine during times of increased airflow. As a result, unstable combustion and/or engine misfire may occur. The engine 10 may further include one or more oxygen sensors positioned in the intake passage 42 and/or the intake manifold 44.

The intake manifold 44 includes a MAP sensor 122 for measuring an absolute manifold pressure (MAP). As discussed further below, the output of the MAP sensor 122 may be used to estimate other engine system pressures such as BP. In some embodiments, the intake passage 22 may include a boost pressure sensor 126. However, in other embodiments, the intake passage may not include the boost pressure sensor 126. Additionally, a mass air flow (MAF) sensor 120 may be positioned in the intake passage 42, upstream of the compressor 60.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from the MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors not depicted may also be present, such as a sensor for determining ambient air temperature and/or humidity, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIGS. 2-3.

The system of FIG. 1 provides for an engine system including an intake passage, a turbocharger including a compressor positioned in the intake passage, a primary throttle positioned in an intake manifold of the engine, a charge air cooler positioned upstream of the primary throttle, and a secondary throttle positioned in the intake passage, downstream of the compressor, and upstream of the charge air cooler. The system further includes a controller with computer readable instructions for adjusting the secondary throttle responsive to a condensate level in the charge air cooler. The computer readable instructions further include instructions for decreasing an opening of the secondary throttle based on torque demand and the condensate level and increasing an opening of the primary throttle based on the decreasing the opening of the secondary throttle and the torque demand responsive to the condensate level decreasing below a threshold level.

As discussed above, condensate may form within a charge air cooler (CAC). Over time, condensate may accumulate within the CAC, thereby resulting in an increasing level (or amount) of condensate within the CAC. During conditions of increased air flow through the CAC (such as during a tip-in), condensate may be blown out of the CAC and enter the engine. In some cases, this may cause unstable combustion and/or engine misfire. Different methods may be used to reduce condensate formation and/or remove condensate from the CAC. Some of these methods, or engine operating parameter adjustments, may aim to increase the temperature of the air flowing through the CAC. For example, an engine controller may adjust vehicle grille shutters, an engine cooling fan operation, a dedicated CAC fan operation, and/or alternative engine operating conditions to reduce cooling airflow to the CAC and thereby increase CAC air temperature. However, in some examples, it may be expensive or difficult to block airflow to the CAC. Specifically, blocking airflow to the CAC may also block airflow to other engine components that may need the cooling airflow.

Another method of decreasing CAC condensate formation may include lowering the CAC air pressure without lowering the air temperature. Lowering the air pressure within the CAC in this way may result in lowering the relative humidity of the air within the CAC. As a result of decreasing the relative CAC humidity, both condensate formation and the level of condensate formation within the CAC may decrease. For example, lowering the relative humidity at the CAC may at least partially dry out the CAC such that the condensate level decreases. Further, lowering the relative humidity at the CAC may reduce condensate formation or prevent condensate from forming within the CAC.

In one example, adjusting a throttle upstream of the CAC may decrease air pressure in the CAC. As discussed above, a secondary throttle (e.g., secondary throttle 90 shown in FIG. 1) may be positioned in series with and upstream from the primary throttle (e.g., primary throttle 21 shown in FIG. 1). The secondary throttle may be positioned downstream from the compressor and upstream of the CAC. Decreasing an opening of the secondary throttle may decrease the CAC air pressure and subsequently the relative humidity at the CAC. For example, decreasing the opening of the secondary throttle may include decreasing the throttle angle and/or partially closing the secondary throttle.

As one example, during condensate forming conditions, the engine controller may decrease the opening of the secondary throttle. Condensate forming conditions may include when a CAC pressure and/or CAC temperature are below a dew point. Condensate forming conditions may further include during rainy or humid ambient conditions (e.g., when ambient humidity is above a threshold humidity). As a result of decreasing the opening of the secondary throttle, condensate formation may be reduced within the CAC.

As another example, during conditions when the condensate level within the CAC is greater than a threshold, the engine controller may decrease the opening of the secondary throttle. As a result, the condensate level in the CAC may decrease. The threshold may be a threshold level or amount of condensate that may cause unstable combustion and/or engine misfire if ingested by the engine. The amount of decreasing the opening of the secondary throttle (e.g., the target position of the throttle plate of the throttle) may be based on the condensate level and conditions of the CAC. For example, the controller may decrease the opening of the secondary throttle by a greater amount if the CAC relative humidity is at a higher level and it must be decreased by a greater amount in order to dry out the CAC. Further details on decreasing the secondary throttle opening are discussed below with reference to FIG. 2.

In another example, the opening of the secondary throttle may be reduced responsive to the air in the CAC being above the dew point. For example, if condensate formation cannot be reduced by decreasing CAC air temperature, then the controller may instead reduce condensate formation by decreasing the secondary throttle opening and decreasing CAC pressure. As a result, the air in the CAC may decrease below the dew point. Further, in other examples, the secondary throttle opening may be reduced during low load conditions (e.g., when MAP is below barometric pressure) to reduce condensate formation.

Decreasing the opening of the secondary throttle may result in a decrease in the pressure of the air and a decrease in mass air flow to the engine. Thus, in order to maintain torque at a demanded level, the engine controller may increase the opening of the primary throttle during the decreasing the opening of the secondary throttle. Increasing the opening of the primary throttle may compensate for the reduced primary throttle inlet pressure due to partially closing the secondary throttle. As such, a position of the primary throttle during decreasing the secondary throttle may be based on the amount of decreasing the secondary throttle (e.g., a position of the secondary throttle) and torque demand.

In some examples, the primary throttle may already be open at or close to a maximal amount (e.g., at or near wide open throttle, WOT). In this example, the primary throttle may not be able to be opened further (or far enough) to compensate for reducing the secondary throttle opening during a CAC dry-out event. Decreasing the opening of the secondary throttle in this example may result in a torque output lower than the torque demand. Thus, if the primary throttle is already fully open (or close to fully open), the controller may not decrease the secondary throttle opening, even if the condensate level is greater than the threshold. In this way, torque output may be maintained at a demanded level. Further, when the condensate level in the CAC is less than the threshold, the secondary throttle may be maintained fully open while the primary throttle is adjusted based on torque demand. In another example, the opening of the secondary throttle may be maintained at a position slightly smaller than fully open when the condensate level in the CAC is less than the threshold. As such, opportunistically decreasing the CAC pressure by decreasing the opening of the secondary throttle may reduce condensate formation at the CAC while also maintaining air charge control and delivering the demanded torque.

In this way, an engine method may comprise adjusting a secondary throttle positioned downstream of a compressor and upstream of a charge air cooler responsive to condensate forming conditions at the charge air cooler. In one example, condensate forming conditions may include a condensate level increasing above a threshold level. In another example, condensate forming conditions may be determined based on ambient humidity and/or temperature, CAC temperature, and/or inferred rain conditions (e.g., from windshield wiper duty cycle). The secondary throttle is further positioned upstream of a primary throttle, the primary throttle positioned in an intake manifold and downstream from the charge air cooler.

The method may further comprise adjusting the primary throttle based on torque demand and a position of the secondary throttle. In one example, adjusting the secondary throttle includes decreasing an opening of the secondary throttle in response to a charge air cooler condensate level greater than a threshold when the primary throttle is not fully open. An amount of decreasing the opening of the secondary throttle is based on one or more of the charge air cooler condensate level, a charge air cooler pressure, a charge air cooler humidity, torque demand, and a position of the primary throttle. The method may further comprise increasing an opening of the primary throttle during the decreasing the opening of the secondary throttle, an amount of increasing based on the amount of decreasing the opening of the secondary throttle and torque demand. Further, the decreasing the opening of the secondary throttle includes decreasing the opening for a duration. After the duration, the method may include increasing the opening of the secondary throttle to wide open throttle and adjusting the primary throttle based on torque demand. Additionally, the method may include adjusting variable cam timing to increase manifold vacuum and maintain a demanded torque output during the decreasing the opening of the secondary throttle.

In another example, adjusting the secondary throttle includes fully opening the secondary throttle responsive to one or more of a charge air cooler condensate level less than a threshold or a command for wide open throttle. The method may further comprise adjusting the primary throttle based on torque demand during one or more of the charge air cooler condensate level below the threshold or the command for wide open throttle. Additionally, the method may include adjusting one or more of an engine cooling fan, a charge air cooler fan, or vehicle grille shutters in response to the condensate forming conditions.

Turning now to FIG. 2, a method 200 is shown for adjusting a secondary intake throttle based on condensate formation in a charge air cooler. As discussed above, an engine intake may include a secondary throttle upstream of a primary throttle. The secondary throttle may be positioned between a compressor and charge air cooler (CAC). Specifically, an engine controller (such as controller 12 shown in FIG. 1) may adjust a position of the secondary throttle in order to reduce an air pressure within the CAC, thereby reducing condensate within the CAC. The controller may also adjust a position of the primary throttle based on the position of the secondary throttle and torque demand.

The method begins at 202 by estimating and/or measuring engine operating conditions. Engine operating conditions may include engine speed and load, ambient humidity, conditions of the CAC (e.g., temperature, pressure, and humidity), mass air flow, a position of the primary throttle, a position of the secondary throttle, torque demand, EGR flow, etc.

At 204, the level of condensate at the CAC may be determined. This may include retrieving details such as ambient air temperature, ambient air humidity, CAC inlet and outlet charge air temperature, CAC inlet and outlet charge air pressure, and air mass flow rate from a plurality of sensors and determining the amount of condensate formed in the CAC based on the retrieved data. Alternatively at 204, the method may include determining the propensity to form condensate. Said another way, at 204 the method may include if condensate forming conditions are present. For example, if the CAC temperature is above a threshold, ambient humidity is above a threshold, and/or it is raining, condensate formation may be likely at the CAC. In yet other examples, the method at 204 may include determining whether the CAC may benefit from a decrease in pressure (e.g., reduce the likelihood for condensate to form under the current ambient and CAC conditions). In this way, decreasing the secondary throttle opening and decreasing CAC pressure may be preventative and reduce the likelihood of condensate building up within the CAC. Under these conditions, the controller may only reduce the secondary throttle opening if it may not negatively affect torque output, as described further below.

In one example, at 206, and as further elaborated at the model of FIG. 3, the rate of condensate formation within the CAC may be based on ambient temperature, CAC outlet temperature, mass flow, EGR, and humidity. In another example, at 308, a condensation formation value may be mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

At 210, the method includes determining if the condensate level at the CAC is higher than a threshold level. As such, the threshold level may correspond to an amount of condensate above which may cause unstable combustion and/or engine misfire if blown out of the CAC and ingested at once by the engine. In some examples, the threshold level may be reduced in order to dry out the CAC more frequently. As discussed above, in other examples, the method at 210 may include determining if condensate is forming or is likely to form within the CAC (based on CAC temperature, pressure, ambient temperature, ambient humidity, rain conditions, etc.). In this example, if condensate is forming or likely to form, the method may continue on to 214.

If the condensate level is not greater than the threshold, the method continues on to 212 to open the secondary throttle and adjust a position of the primary throttle based on torque demand. For example, the method at 212 may include fully opening the secondary throttle. In another example, the method at 212 may include increasing the opening of the secondary throttle to a position below WOT. The method at 212 may further include increasing or decreasing the opening of the primary throttle as torque demand increase or decreases, respectively. In this way, the primary throttle may be adjusted based on torque demand while the primary throttle is maintained open.

Alternatively, if the CAC condensate level is greater than the threshold at 210, the method continues on to 214 to determine the position of the primary throttle. Specifically, the method at 214 includes determining if the primary throttle is fully open (e.g., at WOT). In another example, the method at 214 may determine if the primary throttle is able to be opened further and deliver the required torque while decreasing the opening of the secondary throttle. If the primary throttle is not fully open and may be opened further to maintain torque, the method continues on to 216.

At 216, the controller may decrease the opening of the secondary throttle in order to decrease the CAC pressure and subsequently the CAC relative humidity. The method at 216 further includes increasing the opening of the primary throttle to compensate for the decrease in mass air flow due to decreasing the opening of the secondary throttle. As such, the amount of increasing the opening of the primary throttle may be based on the torque demand and amount of decreasing the opening the secondary throttle. The amount of decreasing the opening of the secondary throttle may be based on the condensate level (e.g., the amount of condensate in the CAC), conditions at the CAC (e.g., CAC temperature, pressure, and humidity), torque demand, mass air flow conditions, and/or the position of the primary throttle. For example, the controller may close the secondary throttle by a greater amount as the condensate level and/or humidity level increases. However, the amount of decreasing may be limited by the torque demand and how much the primary throttle may be opened. For example, the secondary throttle may be closed by a smaller amount if the torque demand is at a higher level and the position of the primary throttle is closer to WOT. In another example, the method at 216 may include opening the primary throttle to WOT and then adjusting the secondary throttle based on torque demand. As such, the opening of the secondary throttle may be decreased but not decreased to a level that reduces torque output below a demanded level.

At 216, the controller may decrease the opening of the secondary throttle for a duration. The duration may be based on an amount of time to decrease the condensate level below the threshold level. In another example, the duration may be based on the CAC pressure and the amount of condensate in the CAC. As such, the duration may increase as the level of CAC condensate increases, the CAC humidity increases, and/or the CAC pressure increases. In another example, the controller may decrease the opening of the secondary throttle until the condensate level decreases below the threshold level. As such, the duration may increase with increasing condensate level. In some examples, the controller may decrease the opening of the secondary throttle until the condensate level decreases an amount below the threshold level (e.g., a lower threshold level) or until the CAC condensate level is nearly zero. However, if torque demand increases to a level requiring a wider opening of the secondary throttle during the decreasing, the controller may increase the opening of the secondary throttle before the CAC condensate level reaches the lower threshold level. As such, the duration of decreasing may be based on the CAC condensate level and torque demand. After decreasing the opening of the secondary throttle for the duration at 216, the controller may increase the opening of the secondary throttle to wide open throttle (WOT) and adjust the primary throttle based on torque demand. In other embodiments, the controller may maintain the partially open position of the secondary throttle until torque demand increases, thereby requiring increased mass air flow and opening of the secondary throttle.

Further, the method at 216 may include adjusting variable cam timing (VCT) in order to increase manifold vacuum while maintaining the requested engine output torque (e.g., torque demand). In one example, this may include advancing an intake cam. If the primary throttle cannot be further opened at 214, the method instead continues on to 218. At 218 the method includes adjusting the primary throttle based on torque demand and not decreasing the opening of the secondary throttle. In one example, the method at 214 includes maintaining a position of the secondary throttle while increasing or decreasing the opening of the primary throttle based on torque demand. In another example, the method at 214 includes fully opening the secondary throttle while adjusting the primary throttle based on torque demand. At 220, the method may include adjusting alternative engine operating parameters to decrease CAC condensate. For example, the controller may decrease grille shutter opening, decrease engine cooling fan operation, and/or decrease CAC fan operation in order to reduce condensate formation within the CAC. In some embodiments, the method at 216 may also include adjusting the alternative engine operating parameters described above at 220.

FIG. 3 illustrates a method 300 for estimating the amount of condensate stored within a CAC. Based on the amount (e.g., level) of condensate at the CAC relative to a threshold value, an engine controller may adjust a primary throttle and/or a secondary throttle, as discussed at FIG. 2.

The method begins at 302 by determining the engine operating conditions. These may include, as elaborated previously at 202, ambient conditions, CAC conditions (inlet and outlet temperatures and pressures, flow rate through the CAC, etc.), mass air flow, MAP, EGR flow, engine speed and load, engine temperature, boost, etc. Next, at 304, the routine determines if the ambient humidity is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set to 100% at 306. However, if the humidity is known, the known humidity value, as provided by the humidity sensor, may be used as the humidity setting at 308.

The ambient temperature and humidity may be used to determine the dew point of the intake air, which may be further affected by the amount of EGR in the intake air (e.g., EGR may have a different humidity and temperature than the air from the atmosphere). The difference between the dew point and the CAC outlet temperature indicates whether condensation will form within the cooler, and the mass air flow may affect how much condensation actually accumulates within the cooler. At 310, an algorithm may calculate the saturation vapor pressure at the CAC outlet as a function of the CAC outlet temperature and pressure. The algorithm then calculates the mass of water at this saturation vapor pressure at 312. Finally, the condensation formation rate at the CAC outlet is determined at 314 by subtracting the mass of water at the saturation vapor pressure condition at the CAC outlet from the mass of water in the ambient air. In some examples, the method at 314 may first determine a mass of water formation over time. Integrating this value may then give the mass of water within the CAC (e.g., condensate formation value). By determining the amount of time between condensate measurements at 316, method 300 may determine the amount of condensate within the CAC since a last measurement at 318. The current condensate amount in the CAC is calculated at 322 by adding the condensate value estimated at 318 to the previous condensate value and then subtracting any condensate losses since the last routine (that is, an amount of condensate removed. for example, via purging routines) at 320. Condensate losses may be assumed to be zero if the CAC outlet temperature was above the dew point. Alternatively, at 320, the amount of condensate removed may be modeled or determined empirically as a function of air mass and integrated down with each software task loop (that is, with each run of routine 300).

As such, the method of FIG. 3 may be used by the controller during the routine of FIG. 2 to use a modeling method for estimating the amount of condensate at the CAC. In alternate embodiments, the engine control system may use a mapping method to map the amount of condensate at the CAC to a CAC inlet/outlet temperature, an ambient humidity, and an engine load. For example, the values may be mapped and stored in a look-up table that is retrieved by the controller during the routine of FIG. 2, and updated thereafter.

FIG. 4 shows example adjustments to a primary throttle position and a secondary throttle position based on CAC condensate and torque demand. Specifically, graph 400 shows changes in an opening of a primary throttle at plot 402, changes in an opening of a secondary throttle at plot 404, changes in condensate level within a CAC at plot 406, changes in CAC pressure at plot 408, changes in torque demand at 410, and changes in a position of grille shutters at 412. As discussed above, the secondary throttle may be positioned in the intake, upstream of the primary throttle and the CAC. The controller may adjust the primary throttle and/or the secondary throttle into a plurality of positions between a fully closed and a fully open (e.g., WOT) position. As such, the controller may adjust the opening of the two throttles separately.

Prior to time t1, the CAC condensate level may be below the threshold T1. As a result, the secondary throttle may be open (plot 404). The controller may adjust the primary throttle based on torque demand before time t1. At time t1, the CAC condensate level increases above the threshold T1 (plot 406). Additionally at time t1, the primary throttle is not fully open (plot 402). In response to the condensate level increasing above the threshold T1 and the primary throttle not being completely open, the controller may decrease the opening of the secondary throttle (plot 404) for a duration d1. The controller may also increase the opening of the primary throttle (plot 402) in order to maintain mass air flow and deliver the demanded torque during the decreasing the opening of the secondary throttle.

As seen between time t1 and time t2, decreasing the opening of the secondary throttle results in a decrease in CAC pressure (plot 408). As a result, the condensate level in the CAC decreases back below the threshold T1. After decreasing the opening of the secondary throttle for the duration d1, the controller may increase the opening of the secondary throttle to wide open throttle (WOT) and adjust the primary throttle based on torque demand at time t2. In other examples, if the torque demand had increased prior to time t2 (requiring more airflow than the secondary throttle could provide at WOT), the controller may have increased the opening of the secondary throttle even through the duration d1 had not passed.

At time t2, the controller may gradually increase the opening of the secondary throttle while gradually decreasing the opening of the primary throttle in order to maintain relatively constant mass air flow and continue delivering the demanded torque. As the torque demand increases after time t2 (plot 410), the controller increases the opening of the primary throttle. At time t3, the CAC condensate level increases above the threshold T1. However, the primary throttle is fully open at time t3. As a result, the controller does not decrease the opening of the secondary throttle and instead maintains the secondary throttle positions at time t3. In some examples, as shown in FIG. 4, the controller may close the grille shutters at time t3 to help reduce condensate formation. In other examples, the controller may adjust additional or alternative engine operating parameters (e.g., engine cooling fan operation) in order to reduce condensate formation at the CAC.

As shown at time t1 in FIG. 4, during a first condition when a condensate level in a charge air cooler is greater than a threshold and a primary throttle is not fully open, a method may include decreasing an opening of a secondary throttle, the secondary throttle positioned upstream of the charge air cooler. The method may further include during a second condition, as shown before time t1 and between time t2 and time t3, when the condensate level is less than the threshold, adjusting the primary throttle based on torque demand.

As described above, the secondary throttle is positioned upstream of the primary throttle in an engine intake and the secondary throttle is further positioned downstream from a compressor in the engine intake. Further, during the first condition, the method includes increasing an opening of the primary throttle based on torque demand and an amount of decreasing the opening of the secondary throttle. In some examples, decreasing the opening of the secondary throttle during the first conditions includes decreasing the opening for a duration (e.g., duration d1), the duration based on one or more of the condensate level and torque demand. Further, during the second condition, the method may include opening the secondary throttle to wide open throttle.

The method further includes, during a third condition, as shown at time t3, when the condensate level is greater than the threshold and the primary throttle is at wide open throttle, not decreasing the opening of the secondary throttle and maintaining the primary throttle at wide open throttle. Further, during the third condition, the method may include adjusting one or more of vehicle grille shutters, an engine cooling fan, or a charge air cooler fan to decrease the condensate level. For example, as shown in FIG. 4, the grille shutters may be opened during the third condition.

In this way, an engine controller may separately adjust a primary throttle and a secondary throttle in an intake system based on CAC condensate and torque demand. Decreasing the opening of the secondary throttle when the CAC condensate level is above a threshold may result in a decrease in CAC pressure, thereby reducing condensate stored within the CAC. As a result, a technical effect of the invention is achieved by decreasing the opening of the secondary throttle and reducing condensate in the CAC. By reducing the condensate level in the CAC, the likelihood of engine misfire and/or unstable combustion due to condensate ingestion may be reduced.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling an engine having an engine controller including executable instructions stored on a non-transitory computer readable medium, the method comprising:
   determining whether condensate forming conditions are present at a charge air cooler; and
   responsive to condensate forming conditions being present, adjusting a degree of opening of a secondary throttle positioned downstream of a compressor and upstream of the charge air cooler via electronic throttle control responsive to condensate forming conditions at the charge air cooler.

2. The method of claim 1, wherein the secondary throttle is further positioned upstream of a primary throttle, the primary throttle positioned in an intake manifold and downstream from the charge air cooler.

3. The method of claim 2, further comprising determining an engine torque demand by the engine controller; and
   adjusting a degree of opening of the primary throttle via the electronic throttle control based on the torque demand and the degree of opening of the secondary throttle.

4. The method of claim 2, further comprising:
   determining a level of condensate in the charge air cooler by the engine controller;
   determining a degree of opening of the primary throttle by the engine controller; and
   if the level of condensate in the charger air cooler is greater than a threshold and the primary throttle is either closed or less than fully open, decreasing the degree of opening of the secondary throttle via the electronic throttle control.

5. The method of claim 4, further comprising determining a level of pressure in the charge air cooler, a level of humidity in the charge air cooler, and an engine torque demand by the engine controller,
   wherein decreasing the degree of opening of the secondary throttle if the level of condensate in the charger air cooler is greater than the threshold and the primary throttle is either closed or less than fully open comprises decreasing the degree of opening of the secondary throttle by an amount which is determined based on one or more of the level of condensate in the charge air cooler, the level of pressure in the charge air cooler, the level of humidity in the charge air cooler, the torque demand, and the degree of opening of the primary throttle.

6. The method of claim 5 further comprising, if the level of condensate in the charger air cooler is greater than the threshold and the primary throttle is either closed or less than fully open, increasing the degree of opening of the primary throttle via the electronic throttle control while during the decreasing the degree of opening of the secondary throttle, wherein an amount by which the degree of opening of the primary throttle is increased is based on the amount by which the degree of opening of the secondary throttle is decreased and the torque demand.

7. The method of claim 4, wherein the decreasing the degree of opening of the secondary throttle includes decreasing the degree of opening of the secondary throttle for a duration, the method further comprising, after the duration, increasing the degree of opening of the secondary throttle to wide open throttle via the electronic throttle control and adjusting the degree of opening of the primary throttle via the electronic throttle control based on the torque demand.

8. The method of claim 4, further comprising adjusting variable intake cam timing to increase intake manifold vacuum and maintain a demanded torque output during the decreasing of the degree of opening of the secondary throttle by the engine controller.

9. The method of claim 2, further comprising:
   determining a level of condensate in the charge air cooler by the engine controller; and
   determining whether a command for wide open throttle is present by the engine controller;
   wherein adjusting the degree of opening of the secondary throttle includes fully opening the secondary throttle with the controller via the electronic throttle control responsive to one or more of the level of condensate in the charge air cooler being less than a threshold and the command for wide open throttle being present.

10. The method of claim 9, further comprising:
    determining an engine torque demand by the engine controller; and
    if the level of condensate in the charge air cooler is less than the threshold, and/or if the command for wide open throttle is present, adjusting a degree of opening of the primary throttle via the electronic throttle control based on the torque demand.

11. The method of claim 1, further comprising, if condensate forming conditions are present, adjusting, by the engine controller, one or more of an engine cooling fan, a charge air cooler fan, and vehicle grille shutters in response to the condensate forming conditions.

12. A method of controlling an engine having an engine controller including executable instructions stored on a non-transitory computer readable medium, the method comprising:
    determining a level of condensate in a charge air cooler;
    determining a degree of opening of a primary throttle;

determining an engine torque demand;

during a first condition when the level of condensate in the charge air cooler is greater than a threshold and the primary throttle is closed or less than fully open, decreasing a degree of opening of a secondary throttle via electronic throttle control, the secondary throttle positioned upstream of the charge air cooler; and during a second condition when the level of condensate in the charge air cooler is less than the threshold, adjusting the degree of opening of the primary throttle via the electronic throttle control based on the torque demand.

13. The method of claim 12, wherein the secondary throttle is positioned upstream of the primary throttle in an engine intake and wherein the secondary throttle is further positioned downstream from a compressor in the engine intake.

14. The method of claim 12, further comprising during the first condition, increasing the degree of opening of the primary throttle via the electronic throttle control based on the torque demand and further based on an amount by which the degree the opening of the secondary throttle is decreased during the first condition by the engine controller.

15. The method of claim 12, further comprising during the second condition, opening the secondary throttle to wide open throttle via the electronic throttle control by the engine controller.

16. The method of claim 12, further comprising during a third condition when the level of condensate in the charge air cooler is greater than the threshold and the primary throttle is at wide open throttle not decreasing the degree of opening of the secondary throttle and maintaining the primary throttle at wide open throttle via the electronic throttle control.

17. The method of claim 16, further comprising during the third condition adjusting one or more of vehicle grille shutters, an engine cooling fan, and a charge air cooler fan to decrease the level of condensate in the charge air cooler by the controller.

18. The method of claim 12, wherein decreasing the degree of opening of the secondary throttle during the first condition includes decreasing the degree of opening of the secondary throttle for a duration, the duration based on one or more of the level of condensate in the charge air cooler and the torque demand.

19. A system for an engine, comprising:

an intake passage;

a turbocharger including a compressor positioned in the intake passage;

a primary throttle positioned in an intake manifold of the engine;

a charge air cooler positioned upstream of the primary throttle;

a secondary throttle positioned in the intake passage, downstream of the compressor, and upstream of the charge air cooler; and a controller with computer readable executable instructions stored on a non-transitory medium for determining a level of condensate in the charge air cooler and adjusting a degree of opening of the secondary throttle by adjusting a position of a throttle plate of the secondary throttle via electronic throttle control responsive to the level of condensate in the charge air cooler.

20. The system of claim 19, wherein the computer readable executable instructions further include instructions for:

determining an engine torque demand;

decreasing the degree of opening of the secondary throttle by decreasing an angle of the throttle plate of the secondary throttle relative to a direction of air flow through the intake passage based on the torque demand and the condensate level of condensate in the charge air cooler; and responsive to the level of condensate in the charge air cooler decreasing below a threshold, increasing a degree of opening of the primary throttle based on an amount by which the degree of opening of the secondary throttle is decreased and the torque demand.

* * * * *